United States Patent
Uchida

(10) Patent No.: US 11,036,788 B2
(45) Date of Patent: Jun. 15, 2021

(54) INFORMATION PROCESSING DEVICE, INFORMATION PROCESSING METHOD, PROGRAM, AND STORAGE MEDIUM

(71) Applicant: Rakuten, Inc., Tokyo (JP)

(72) Inventor: Yuki Uchida, Tokyo (JP)

(73) Assignee: Rakuten, Inc., Tokyo (JP)

( * ) Notice: Subject to any disclaimer, the term of this patent is extended or adjusted under 35 U.S.C. 154(b) by 261 days.

(21) Appl. No.: 16/324,389

(22) PCT Filed: Aug. 9, 2016

(86) PCT No.: PCT/JP2016/073415
§ 371 (c)(1),
(2) Date: Jun. 7, 2019

(87) PCT Pub. No.: WO2018/029779
PCT Pub. Date: Feb. 15, 2018

(65) Prior Publication Data
US 2020/0387536 A1     Dec. 10, 2020

(51) Int. Cl.
*G06F 16/583*     (2019.01)
*G06F 16/538*     (2019.01)

(52) U.S. Cl.
CPC .......... *G06F 16/583* (2019.01); *G06F 16/538* (2019.01); *G06K 2209/506* (2013.01)

(58) Field of Classification Search
CPC ............... G06F 16/583; G06F 16/538; G06K 2209/506
See application file for complete search history.

(56) References Cited

U.S. PATENT DOCUMENTS

| | | | |
|---|---|---|---|
| 2011/0225146 A1* | 9/2011 | Boswell | G06F 16/951 707/722 |
| 2014/0149399 A1* | 5/2014 | Kurzion | G06F 16/9535 707/723 |
| 2015/0170001 A1* | 6/2015 | Rabinovich | G06K 9/6267 382/110 |
| 2015/0178681 A1* | 6/2015 | Agarwal | G06Q 10/06 705/26.8 |
| 2017/0249367 A1* | 8/2017 | Bergsma | G06F 16/54 |
| 2018/0157936 A1* | 6/2018 | Lee | G16H 20/60 |

FOREIGN PATENT DOCUMENTS

JP     2003-256647 A     9/2003

OTHER PUBLICATIONS

ITU-R Recommendation BT.709-5, Parameter Values for the HDTV Standards for Production and International Programme Exchange (Year: 2015).*
International Search Report for PCT/JP2016/073415, dated Nov. 8, 2016.

* cited by examiner

*Primary Examiner* — William Spieler
(74) *Attorney, Agent, or Firm* — Sughrue Mion, PLLC

(57) ABSTRACT

Among images contained in information on a posted specific recipe, a predetermined number of the images that are equal to or greater than two are selected as procedure images based on a difference in images. The procedure images concerns a procedure of the specific recipe. Next, procedure outline content, which concerns the procedure of the specific recipe, is generated using the predetermined number of the procedure images. Further, information that contains the procedure outline content is presented as a search result of a search for a recipe.

9 Claims, 10 Drawing Sheets

FIG. 5

INFORMATION PROCESSING DEVICE, INFORMATION PROCESSING METHOD, PROGRAM, AND STORAGE MEDIUM

CROSS REFERENCE TO RELATED APPLICATIONS

This application is a National Stage of International Application No. PCT/JP2016/073415 filed Aug. 9, 2016.

TECHNICAL FIELD

The present disclosure relates to a technical field for an information processing device, an information processing method, a program, and a storage medium. More specifically, the present disclosure relates to various processes for providing a recipe to a user.

CITATION LIST

Patent Literatures

Patent Literature 1: JP 2003-256647 A

BACKGROUND ART

In recent years, recipe search services, etc., that provide accumulated information on a recipe posted by general users are becoming popular.

When selecting one recipe among a plurality of provided recipes, a user generally considers whether or not the recipe is utilizable (e.g., whether or not foodstuffs are available, and whether or not a cooking scheme is applicable).

SUMMARY OF INVENTION

Technical Problem

Meanwhile, when the user attempts to utilize the recipe, it is sometimes difficult for the user to grasp which recipe is appropriate by merely viewing a list of a plurality of recipes presented as a search result. In this case, the user often makes a determination by viewing the detailed information on the recipe. Patent Literature 1 discloses to obtain a cooking procedure from a motion image.

However, it is inconvenient for the user to obtain the cooking procedure by viewing the detailed information on the recipe and by viewing the motion image. Such an inconvenience does not meet a demand to easily grasp the cooking procedure of the recipe from the list of a search result.

In order to address this problem, a search result that is the cooking procedure of a recipe may be presented, but the information quantity increases when the cooking procedure of the recipe is presented as it is, and thus there is a tendency such that it becomes not easy for the user to view. Moreover, since a display area occupied by one recipe becomes too large, it does not meet a user's request to efficiently view the plurality of recipes.

Accordingly, an objective of the present disclosure is to present a search result that facilitates a user to grasp a cooking procedure of a recipe while suppressing a display area occupied by one recipe.

Solution to Problem

An information processing device according to the present disclosure includes: an image selecting unit that selects, among images contained in a posted recipe, a predetermined number of the images which are equal to or greater than two as procedure images based on a difference in images; a content generating unit that generates procedure outline content using the predetermined number of the procedure images; and a presentation control unit that presents a search result containing the procedure outline content.

When the recipe is presented, there is a user who cannot call up, in such a user's mind, an image of how to cook (the cooking procedure). It is difficult for such a user to determine whether or not the user can cook even if the user views the presented recipe.

Accordingly, first, the procedure outline content that contains the procedure images is displayed as a part of the search result.

It is desirable that the image selecting unit of the above-described information processing device should select the procedure image based on cookware shown in the image.

When the user does not own the cookware to be utilized with the recipe, it may be difficult to utilize the recipe (i.e., to cook). Accordingly, at least some of the cookware to be utilized with the recipe are selected as the procedure images.

It is desirable that the image selecting unit of the above-described information processing device should select the procedure image so as to exclude a finished cooking image.

Regarding a search result of a recipe, a finish image is often presented together with the title of cooking and the ingredient, etc. According to the structure of the present disclosure, the predetermined number of the images other than a finished cooking image are selected and is presented to the user as the procedure outline content.

The image selecting unit of the above-described information processing device may select a part of the predetermined number of the procedure images from general-purpose images prepared in addition to the images contained in the posted recipe.

When, for example, even if the number of contained images in the recipe posted by the user is less than the predetermined number, the procedure outline content compensated by the general-purpose image is generated and presented to the user.

The image selecting unit of the above-described information processing device may select the general-purpose image based on text analysis for the posted recipe.

For example, the images corresponding to respective cooking schemes, such as "boil" and "broil", are prepared as the general-purpose images, and the optimized image is selected and presented based on the text analysis result of the cooking procedure contained in the recipe.

It is desirable that the content generating unit of the above-described information processing device should receive a replacement operation or an addition operation of the procedure image, and generates the procedure outline content.

When, for example, the number of the procedure images is less than the predetermined number and thus the procedure outline content cannot be generated, compensation on the procedure image enables the generation of the procedure outline content.

An information processing method according to the present disclosure is an information processing method executed by an information processing device, and includes an image selecting step of selecting, among images contained in a posted recipe, a predetermined number of the images which are equal to or greater than two as procedure images based on a difference in images; a content generating step of generating procedure outline content using the predetermined number of the procedure images; and a presentation control step of presenting a search result containing the procedure outline content.

This information processing method provides an environment in which a search result that facilitates a user to grasp a cooking procedure of a recipe is presented while a display area occupied by one recipe is suppressed.

A program according to the present disclosure is a program that causes an information processing device to execute processes as the above-described information processing method. Such a program achieves the above-described information processing device.

The storage medium according to the present disclosure is a storage medium having stored therein the above-described program.

Advantageous Effects of Invention

According to the present disclosure, it becomes possible to present a search result that facilitates a user to grasp a cooking procedure of a recipe while suppressing a display area occupied by one recipe.

BRIEF DESCRIPTION OF DRAWINGS

FIG. 5 is a diagram illustrating an example of a search result presenting page;

DESCRIPTION OF EMBODIMENTS

Embodiments will be described below in the following sequence.
<1. Entire Structure>
<2. Hardware Configuration>
<3. Functional Structure>
<4. DB>
[4-1. User DB]
[4-2. Recipe DB]
[4-3. Search DB]
[4-4. Webpage DB]
<5. Process Flow>
[5-1. Batch Process]
[5-2. Second Example of Image Selecting Process]
[5-3. Third Example of Image Selecting Process]
[5-4. Fourth Example of Image Selecting Process]
[5-5. Fifth Example of Image Selecting Process]
[5-6. Procedure-Outline-Content Correcting Process]
<6. Modified Example>
[6-1. First Modified Example]
[6-2. Second Modified Example]
<7. Summary>
<8. Program and Storage Medium>

1. Entire Structure

First, an entire structure according to an embodiment of the present disclosure will be described.

Note that in the following description, an example recipe to be described is a cooking recipe (simply referred to as a recipe below). A recipe contains information on a cooking procedure, foodstuffs to be utilized, cookware, etc.

A recipe website managed by a recipe managing server 1 will be described as an example portal site for providing a service which enables a recipe search and a recipe posting, etc., in accordance with a search query specified by a user.

Figure 1:
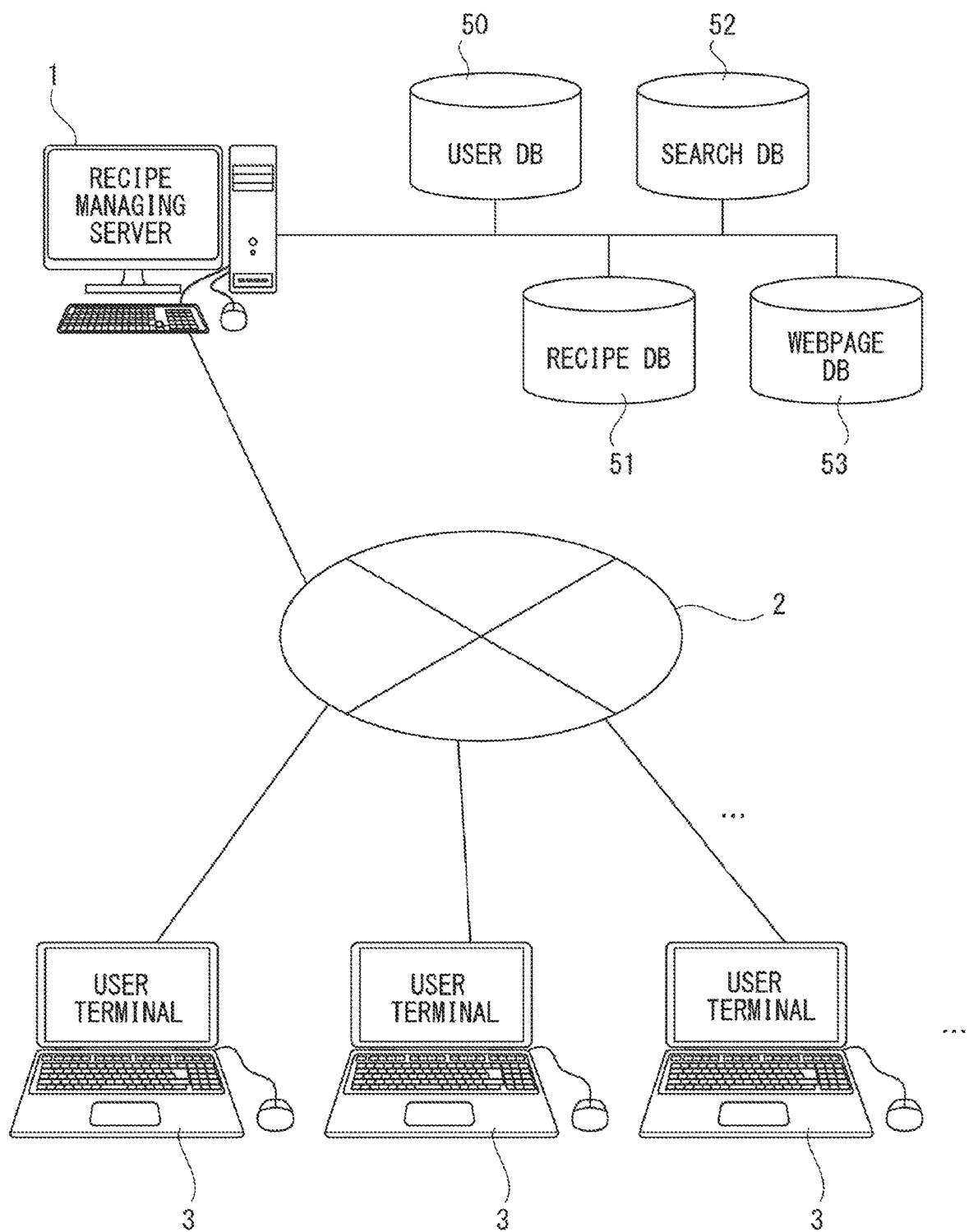
FIG. 1 is an explanatory diagram illustrating an entire structure including an information processing device according to an embodiment of the present disclosure.

An entire structure that includes an information processing device according to the present disclosure is illustrated in FIG. 1.

The recipe managing server 1 is connected to user terminals 3, 3, 3, ... via a communication network 2 so as to be communicable with each other. Moreover, the recipe managing server 1 is connected to a user DataBase (DB) 50 that stores information on a user, a recipe DB 51 that stores information on a recipe, a search DB 52 that stores information on a search query and a search result, and a webpage DB 53 that stores webpage data on various webpages which form a recipe website.

The recipe managing server 1 forms a network system together with the user terminals 3, 3, 3,... and the respective DBs via the communication network 2.

Note that the recipe managing server 1 corresponds to an embodiment of the information processing device according to the present disclosure.

The recipe managing server 1 is an information processing device that executes a process of managing the recipe posted by the user, a process of searching the recipe in accordance with a search query, and a process of presenting a search result to the user. The specific structure will be described later.

The structure of the communication network 2 is not limited to any specific structure. An example communication network is the Internet, an intranet, an extra network, a Local Area Network (LAN), A Community Antenna Tele-Vision (CATV) communication network, a Virtual Private Network (VPN), a telephone network, a mobile communication network, or a satellite communication network.

Moreover, various examples are also assumable for a transmission medium that forms a part of or all of the communication network 2. For example, wired schemes, such as an Institute of Electrical and Electronics Engineers (IEEE) 1394, a Universal Serial Bus (USB), a power line transmission, and a telephone line, or wireless schemes, such as an infrared ray like Infrared Data Association (IrDA), a Bluetooth (registered trademark), a 802.11 wireless communication, a mobile phone network, a satellite connection, and a terrestrial digital network, are applicable.

The user terminal 3 is a terminal utilized by the user who posts the recipe on the recipe managing server 1, and by the user who searches and views recipe information managed by the recipe managing server 1.

The user terminal 3 executes various kinds of transmitting and receiving processes and display processes, etc., as needed. Moreover, the user terminals 3 is, for example, a Personal Computer (PC), a feature phone or a Personal Digital Assistant (PDA) with a communication function, or a smart device, such as a smart phone or a tablet computer.

2. Hardware Configuration

Figure 2:
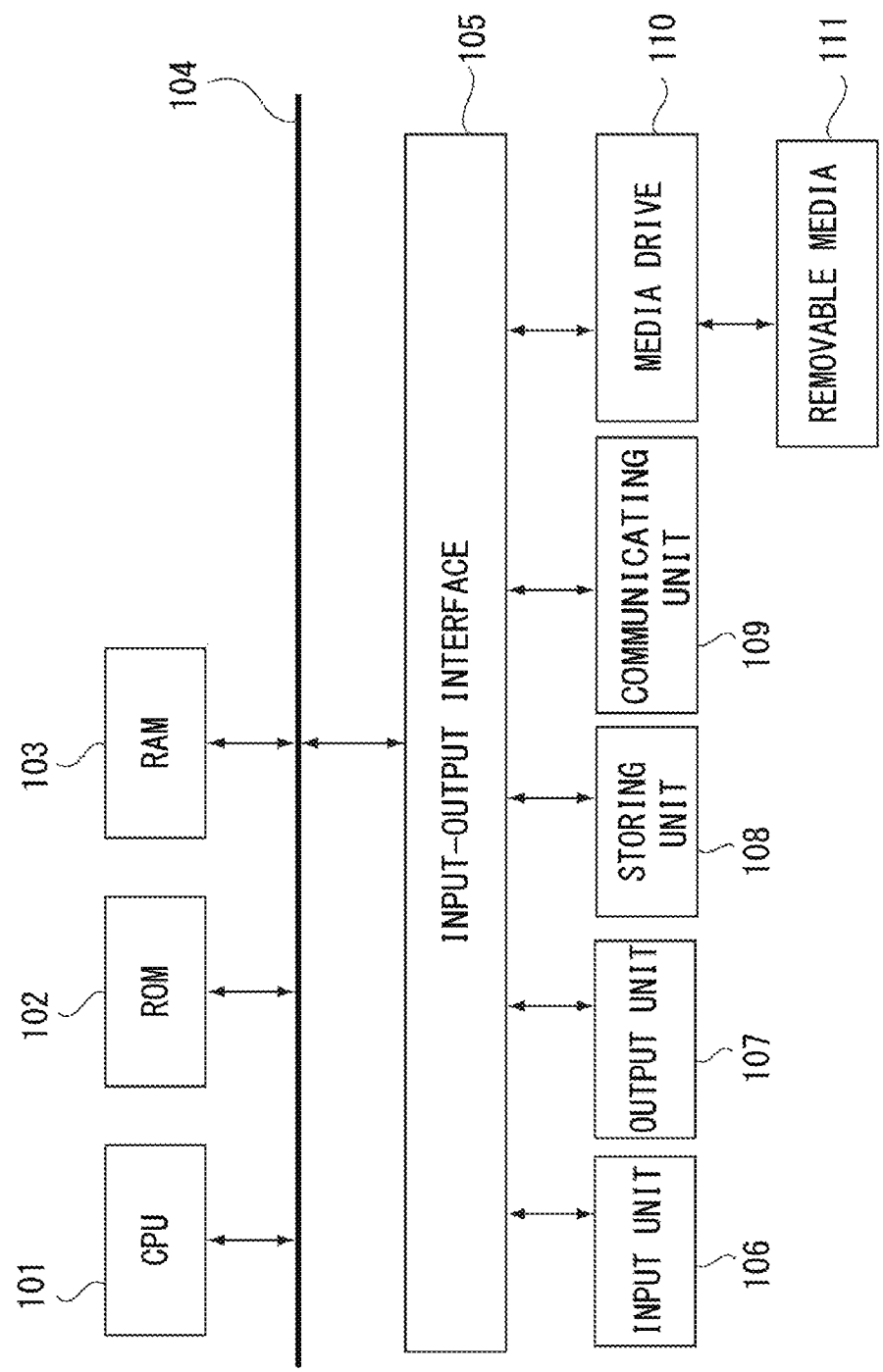
FIG. 2 is a block diagram of a computer apparatus.

FIG. 2 is a diagram illustrating the hardware of the recipe managing server 1, the user terminal 3, the user DB 50, the recipe DB 51, the search DB 52, and the webpage DB 53 as illustrated in FIG. 1. A Central Processing Unit (CPU) 101 of a computer apparatus in each of the servers, the terminals, and the DBs executes various kinds of processes in accordance with programs stored in a Read Only Memory (ROM) 102 or the programs loaded in a Random Access Memory (RAM) 103 from the storing unit 108. The RAM 103 also stores necessary data for the CPU 101 to execute the various kinds of processes as appropriate.

The CPU 101, the ROM 102, and the RAM 103 are mutually connected to each other via a bus 104. An input-output interface 105 is also connected to the bus 104.

Connected to the input-output interface 105 are: an input unit 106, such as a keyboard, a mouse, and a touch panel; an output unit 107, such as a display like a Liquid Crystal Display (LCD), a Cathode Ray Tube (CRT) or an organic ElectroLuminescence (EL) panel, and a speaker; the storing unit 108, such as a Hard Disk Drive (HDD) or a flash memory device; and a communicating unit 109 that executes a communication process and a device-to-device communication via the communication network 2.

A media drive 110 is connected to the input-output interface 105 as needed, and a removable media 111, such as a magnetic disk, an optical disk, a magneto-optical disk, or a semiconductor memory, is loaded therein. Information is written in or read from the removable media 111.

According to such a computer apparatus, the communicating unit 109 is capable of uploading and downloading data and program by communication, and data and program exchange via the removable media 111 is also enabled.

Execution of the processes by the CPU 101 based on the various programs causes each of the recipe managing server 1, the user terminal 3, the user DB 50, the recipe DB 51, the search DB 52, and the webpage DB 53 to execute an information process and a communication to be described later.

Note that each of the information processing device that forms the recipe managing server 1, the user terminal 3, the user DB 50, the recipe DB 51, the search DB 52, and the webpage DB 53 is not limited to a single computer apparatus as illustrated in FIG. 2, but may be a plurality of computer apparatuses that are integrated into system. The plurality of computer apparatuses may be integrated into system by LAN, or may be placed at remote locations so as to be communicable with each other via a Virtual Private Network (VPN) that utilizes the Internet, etc. The plurality of information processing devices may include the information processing devices that are a group of servers (cloud) that is available by cloud computing service.

Note that it is unnecessity for each of the recipe managing server 1, the user terminal 3, the user DB 50 the recipe DB 51, the search DB 52, and the webpage DB 53 to include all the above-described structural components (the CPU 101, etc.). For example, the user DB 50 may have no input device 106, output device 107, and media drive 110, etc.

3. Functional Structure

Figure 3:
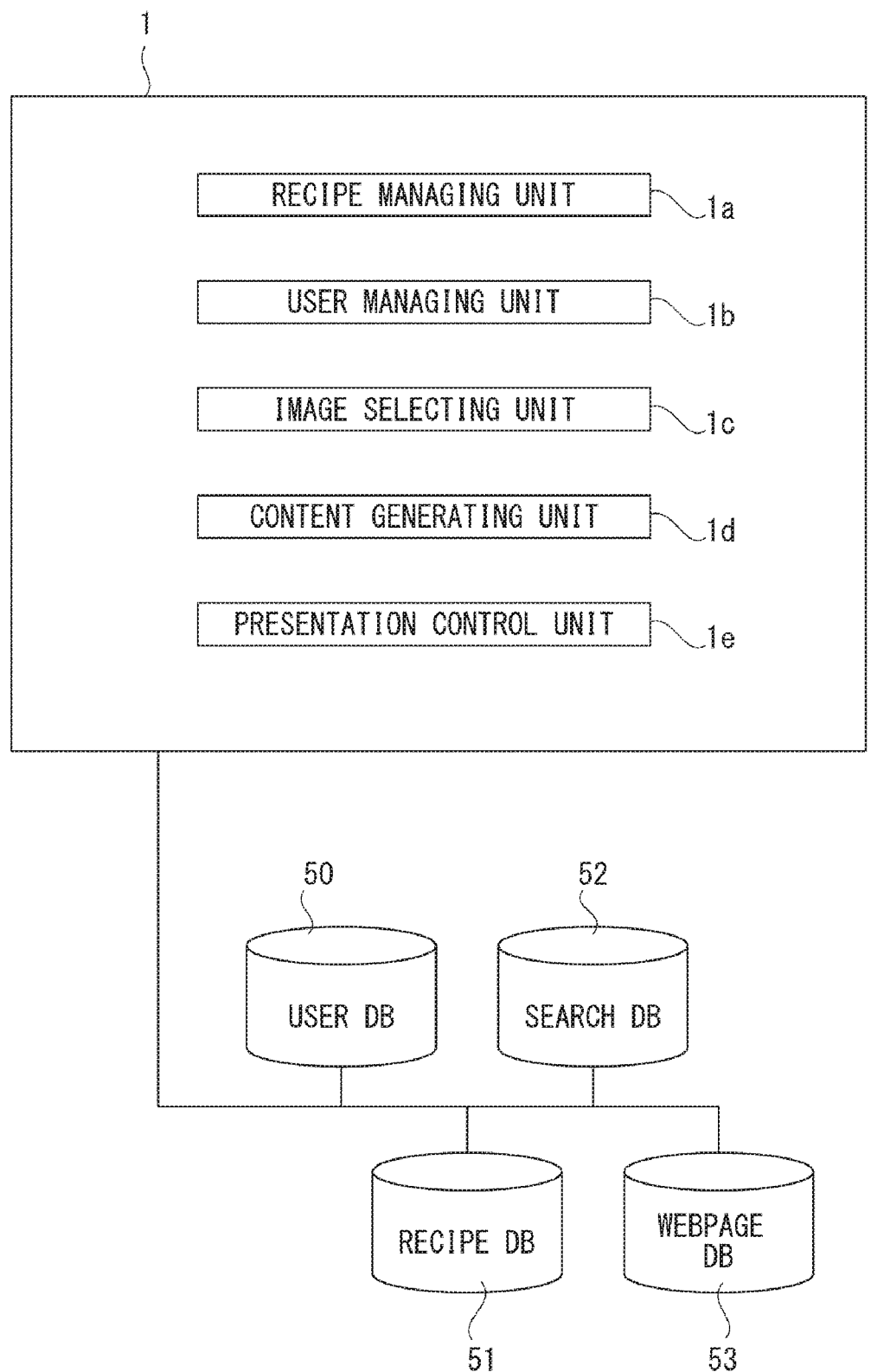
FIG. 3 is a diagram illustrating a functional structure of a user terminal and that of a content server.

As illustrated in FIG. 3, the recipe managing server 1 includes a recipe managing unit 1a, a user managing unit 1b, an image selecting unit 1c, a content generating unit 1d, and a presentation control unit 1e.

The recipe managing unit 1a manages the recipe information posted by the user (the information that associates a recipe title, foodstuffs to be utilized, a cooking scheme, and cooking category information to which the recipe belongs, etc. with each other) by storing such information in the recipe DB 51. For example, the recipe of "vegetable curry" posted by a user is a recipe that belongs to a category "curry". Moreover, utilized foodstuff information, such as "potato", "carrot", "onion", "broccoli", "tomato", "spinach", and seasonings (e.g., "salt" and "pepper"), and other relevant materials (e.g., "curry roux" etc.) are stored in association with each other.

The recipe managing unit 1a manages a creation report posted for each recipe. The creation report is a report which describes, when the other user actually cooked using the posted recipe, the deliciousness of foods and convenience of cooking with respect to such a recipe. The creation report is managed in association with each recipe in the recipe DB 51.

The user managing unit 1b executes various processes in order to manage the information on the user who utilizes various kinds of services provided by the recipe managing server 1.

For example, a name, age, gender, a contact address (e.g., a phone number and an email address) are associated with a user ID that can uniquely specify the user, and those pieces of information are managed by being stored in the user DB 50. Moreover, a process of obtaining user information from the user DB 50 is executed.

The image selecting unit 1c executes a process of selecting an appropriate procedure image for presenting the outline of a cooking procedure of the recipe to the user. When, for example, four procedure images are to be presented to the user so as to show the cooking procedure of the recipe, appropriate four images for indicating the outline of the cooking procedure are selected from a group of images relating to the recipe.

When the procedure image is selected, the feature for each still image is taken into consideration. For example, the image is selected in consideration of cookware and foodstuffs, etc. that are shown in the image. Moreover, the image may be selected based on comments and explanations associated with the image.

The image selecting unit 1c executes a process of selecting a compensation image when the group of images regarding the recipe contains images that are less than a predetermined number (less than four images in the above case). The compensation image is selected from the still image and an illustration image which are registered in the recipe managing server 1 in advance. Example still image and illustration image are an image indicating a cooking scheme (e.g., "broil", "cut", and "boil") and an image indicating foodstuffs to be utilized.

The content generating unit 1d executes a process of generating procedure outline content. The procedure outline content is content that indicates the outline of the cooking procedure, and is content generated using the procedure image selected by the above-described image selecting unit 1c.

Figure 4:
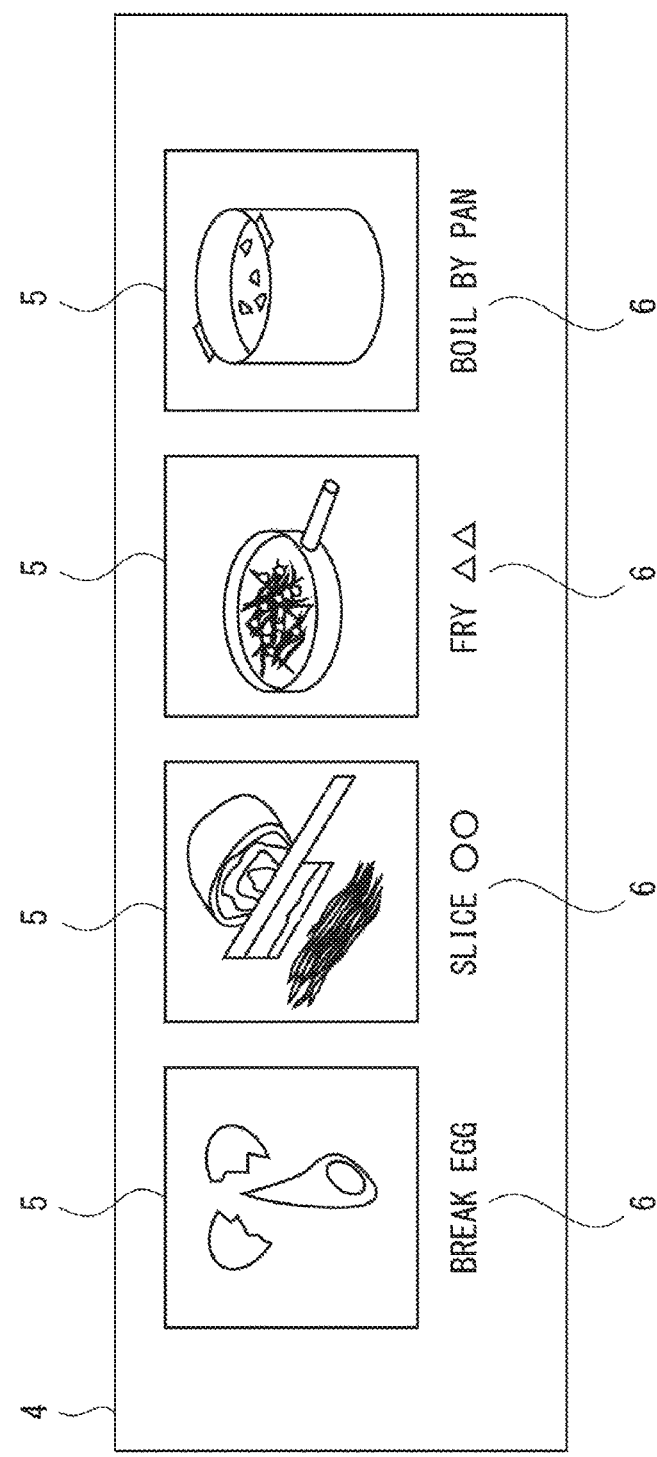
FIG. 4 is a diagram illustrating an example of procedure outline content.

More specifically, as illustrated in FIG. 4, four images (the predetermined number of the images) selected as the procedure images are arranged side by side, and a simple comment is described below each image.

Specific example procedure outline content will be described now.

As illustrated in FIG. 4, the procedure outline content 4 includes procedure images 5, 5, 5 and 5, and text sentences 6, 6, 6 and 6 attached to the respective procedure images 5.

Note that the text sentences 6, 6, 6 and 6 are not always requisite, and the procedure outline content may include only the procedure images 5, 5, 5 and 5. Moreover, the procedure images 5, 5, . . . may be collectively synthesized as a single image.

Note that the sequence of the plurality of procedure images 5, 5, . . . contained in the procedure outline content 4 is a progressing sequence of the procedure. That is, when there is a procedure "boil" after a procedure "broil", the procedure image 5 indicating "boil" is arranged subsequent to the procedure image 5 indicating "broil".

Moreover, the text sentence 6 may be a sentence like "break an egg" to describe work details of the procedure, a word like "bowl" to indicate a cookware applied by work, or a word like "egg" to indicate the foodstuff applied by work. In addition to these examples, various forms of the text sentence 6 are adoptable, and for example, time information indicating a work time may be adopted.

In addition to the above process, the content generating unit 1d executes a process of correcting, etc., of the already-generated procedure outline content.

When, for example, the user adds an image to the procedure outline content 4 generated with the procedure images 5 not reached the predetermined number of the images, the new procedure outline content 4 to which the additional image is added is generated. Moreover, when the user specifies a replacement (change) of a part of the contained procedure images 5, 5, . . . regarding the already-generated procedure outline content 4 that contains the predetermined number of the procedure images 5, in accordance with the replaced procedure image 5, the procedure outline content 4 is generated again.

The presentation control unit 1e executes a process of presenting, to the user terminal 3, a search result that is the recipe extracted in accordance with a user's search query. When the search result is presented, the procedure outline content for each presented recipe is presented.

Figure 5:
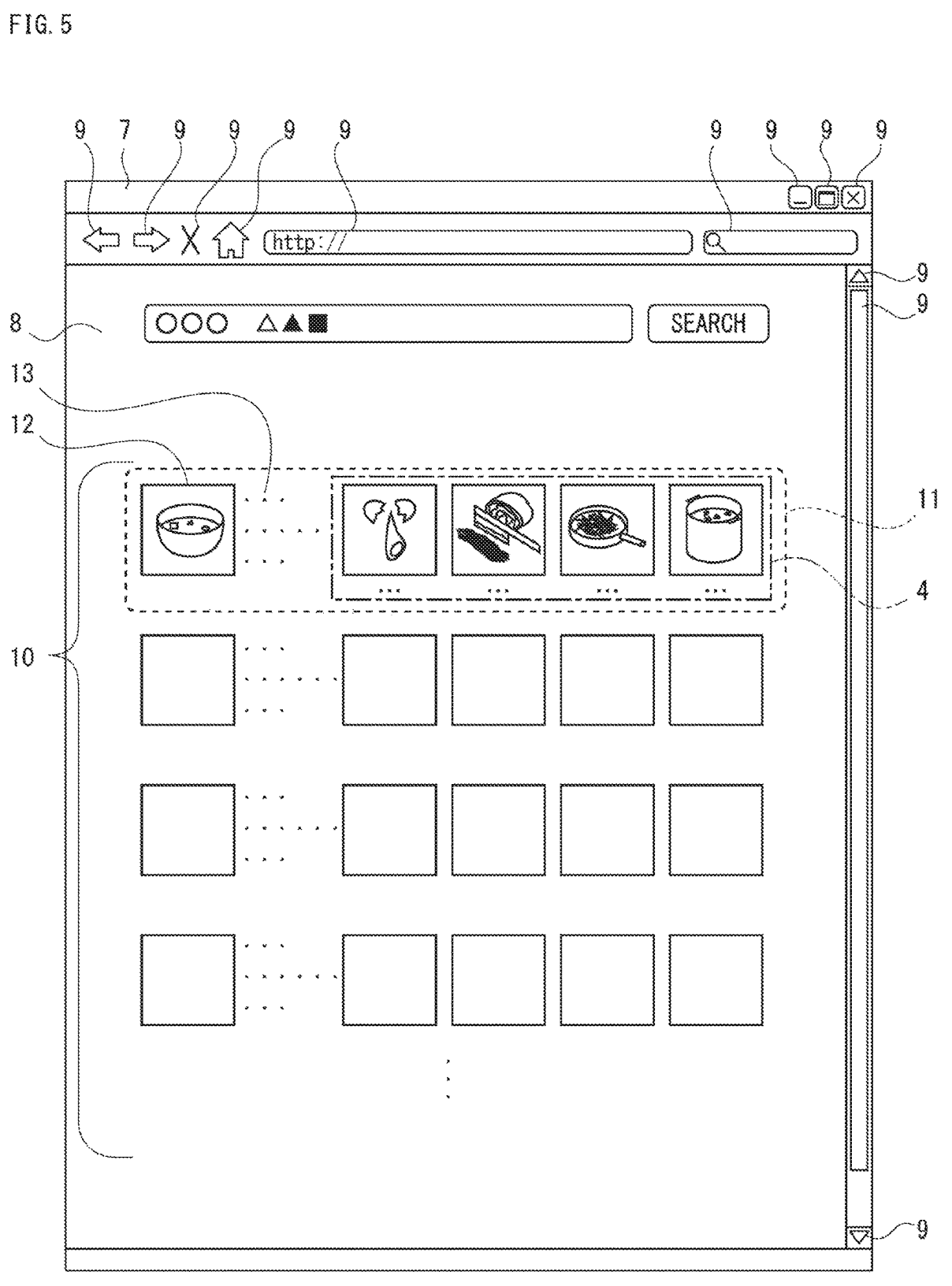

More specifically, a search result presenting page as illustrated in FIG. 5 is to be presented to the user.

The search result presenting page is viewable using a web browser 7 operated on the user terminal 3. The web browser 7 is provided with a webpage display field 8, and various operation elements (such as buttons and input fields) 9, 9, 9,... are provided on the upper part and the side parts.

A search result list 10 is displayed on, together with an input field and a search button for searching, the webpage display field 8 where the search result presenting page is displayed.

The search result list 10 contains plural pieces of recipe information 11, 11, ... as search results. Moreover, the piece of recipe information 11 (a part indicated by dashed lines in FIG. 5) contains a finish image 12 illustrating the state in which cooking has finished, an explanatory sentence 13 describing information, such as the recipe title, the foodstuffs to be utilized, and a cooking time, and the above-described procedure outline content 4 (a part indicated by dot-and-dashed lines in FIG. 5).

As illustrated in FIG. 5, when there are plural pieces of recipe information to be presented, a presentation priority may be given to each recipe information. That is, each recipe information is presented to the user terminal 3 in accordance with the presentation priority.

In addition to the above-described functions and units, the recipe managing server 1 also includes a function to transmit and receive various information, and a unit necessary to achieve an authentication process for a user's login operation. The authentication process is a process of checking up login information which is transmitted from the user terminal 3 and which contains a user IDentification (ID) and a login password with authentication information stored in the user DB 50.

Note that each function of the recipe managing server 1 is a function achieved by a process executed in accordance with a program that is executed by the CPU 101 of the information processing device. However, the process of all of or a part of the above-described structural element may be achieved by hardware.

Moreover, when each function is achieved by a software, it is not unnecessary for each function to be achieved by an individual program. Processes of the plurality of functions may be executed by a single program, and a single function may be achieved by a combination of a plurality of program modules.

Moreover, respective functions may be distributed to the plurality of information processing devices. Furthermore, a single function may be achieved by the plurality of information processing devices.

4. DB

Each DB that is managed by the recipe managing server 1 will be described. Each DB to be described below may be achieved in any forms as long as the recipe managing server 1 is accessible. For example, all of the respective DBs may be formed in a storing unit within the same system as the recipe managing server 1, a part of or all of each DB may be formed as separate components, or may be provided in a computer system at a remote site, etc. Needless to say, it is unnecessary for each DB to be formed in a single device (e.g., a single HDD). Moreover, it is unnecessary for each DB to be formed as a single DB. Information to be stored as, for example, the user DB 50 may be stored and managed by the plural kinds of user DBs (e.g., the user DB for log-in, and the user DB for trading). Each DB to be described below is merely an example in which the storing unit for information relating to the process in this embodiment is formed in the form of a single DB.

4-1. User DB

The user DB 50 stores information on the user who utilizes the service provided by the recipe managing server 1. For example, in association with unique user IDentification (ID) that can specify a single user, personal information, such as a login password, name, age, gender, and email address, is stored.

In addition, the user DB 50 may store preference information for each user. Preference information indicates a user's favorite foodstuff (preference foodstuff) and dislike foodstuff (non-preference foodstuff) determined by the recipe managing server 1 in accordance with the user's behavior. The preference information is utilized when the user searches the recipe.

4-2. Recipe DB

The recipe DB 51 is a DB that stores the information on the recipe posted by the user. More specifically, stored in association with a recipe ID that can identify each recipe are the user ID for specifying the user who posted the recipe, posting date and time information, category information to which the recipe belongs, utilized foodstuff information (including an amount etc.) on the recipe, the cooking procedure of the recipe, image information like a food image (e.g., an image of the finished cooking and an image of the food during cooking), and a creation report ID for specifying the creation report posted by the other user who has actually utilized the recipe (actually cooked).

Furthermore, each recipe ID is associated with information on the procedure outline content that indicates the outline of the cooking procedure on the recipe.

In addition, information on the Uniform Resource Locator (URL) for the detailed page of the recipe may be stored in association with the recipe ID.

Furthermore, the recipe DB 51 stores information on the creation report posted for each recipe. Example stored information on the creation report are text information indicating the details of the report, the user ID that can identify the user who posted the report, and posting date and time information.

4-3. Search DB

The search DB 52 is a DB that stores a search result corresponding to a search query. More specifically, in association with the search query, such as a name of food like "curry" or "hamburg", or a name of foodstuff like "mushroom" or "tomato", the plurality of recipes is stored as search results.

A search process that utilizes the search query is executed periodically in advance so as to eliminate a necessity of executing the search process every time a user's search operation is made, and the search results consequently extracted are stored in the search DB 52 in association with search keywords.

4-4. Webpage DB

The webpage DB 53 stores data on the various webpages to be provided to the user by the recipe managing server 1. More specifically, example webpage data is for a recipe searching page, a special topic page, a search result presenting page, a recipe detail page, and a user page.

As the webpage data, the Uniform Resource Locator (URL) information on the webpage, and layout information on objects (content, such as an image, a text, and a banner) laid out on each webpage are stored. The layout information is information in which the layout form (e.g., a position, a size and a shade) of each object on the webpage is described.

Note that the information stored in the webpage DB 53 may be stored in the form of a structured document file, such as HyperText Markup Language (HTML) or Extensible HyperText Markup Language (XHTML).

5. Process Flow

Various processes executed by the recipe managing server 1 will be described.

Note that in the following description, an example case will be described in which the procedure outline content 4 is generated in advance which is a part of each recipe information to be put on the search result presenting page (see, for example, FIG. 5) presented to the user. Needless to say, the procedure outline content 4 may be generated every time the user makes the search operation. However, by generating such content in advance, the display of the search result presenting page in response to the user's search operation can be accelerated.

An example process of generating the procedure outline content 4 in advance is a batch process.

Moreover, the number of procedure images 5 (the predetermined number of the images) to be contained in the procedure outline content 4 is four unless otherwise noted.

5-1. Batch Process

A flow of the batch process will be described with reference to FIG. 6.

First, the recipe managing server 1 selects, in step S101, the recipe (subject recipe) subjected to each of the subsequent processes.

An example subject recipe is a recipe which is newly posted after the last batch process and which has the procedure outline content 4 not created yet. One recipe is selected among the group of these recipes.

In addition, the subject recipe may include the recipe which needs correction or re-creation of the procedure outline content 4.

The recipe managing server 1 which has selected the one subject recipe executes, in subsequent step S102, an image obtaining process. The image obtaining process is a process of obtaining an image associated with the subject recipe. An example associated image is an image attached so as to explain the cooking procedure when the recipe is posted. Moreover, it may be an image etc., that is attached to the creation report posted with respect to the recipe.

Subsequently, the recipe managing server 1 executes, in step S103, an image selecting process. The image selecting process is a process of selecting the procedure images 5, 5, . . . among the image obtained previously.

Figure 7:
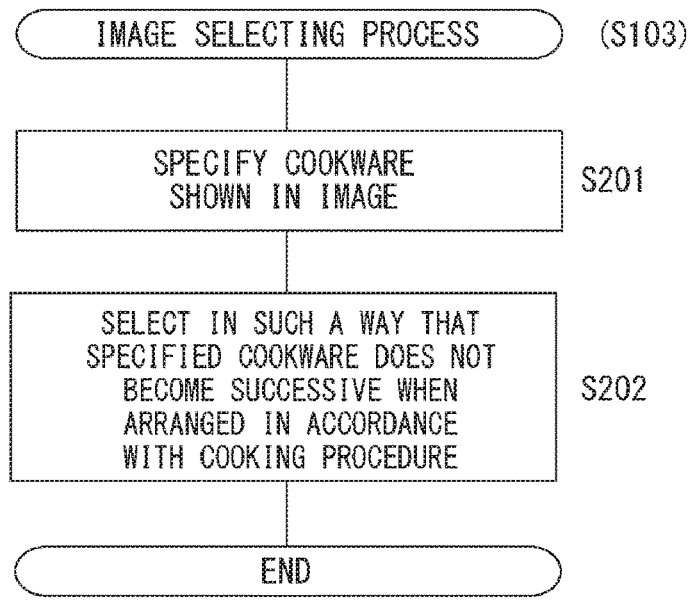
FIG. 7 is a flowchart illustrating an image selecting process.

A specific process will be described with reference to FIG. 7.

The recipe managing server 1 executes, in step S201, a process of specifying the cookware shown in the image. Regarding this process, the cookware can be extracted by conventional technologies like pattern matching that specifies a face of a person from a picture.

After the cookware shown in each image is specified, the recipe managing server 1 selects, in step S202, images in such a way that the specified cookware does not become successive when the images are arranged in accordance with the cooking procedure. At this time, when the predetermined number of the images are selectable, the predetermined number of the images are to be selected.

More specifically, when the cooking procedure includes four procedures "cut an ingredient by kitchen knife", "heat by microwave oven", "broil by frying pan", and "boil by pan", respective images are selected one by one in accordance with the respective procedures.

Moreover, in the case of the four procedures "broil by frying pan", "heat by microwave oven", "broil by frying pan", and "boil by pan", similarly, the one image is selected for each procedure. At this time, the two images of the frying pan may be selected since the procedure "broil by frying pan" duplicates. However, since those are not sequential procedures, there is no problem. That is, since it becomes clear from the four images that there are two procedures to broil by frying pan, this facilitates the viewing user to understand the details of the cooking procedure.

In contrast, although the cooking procedure is in sequence of "cut by kitchen knife", "heat by microwave oven", "broil by frying pan", and "boil by pan", when four images that are the image of a kitchen knife, the image of a microwave oven, the image of a frying pan, and the image of a frying pan are selected as the procedure images 5, 5, . . . , two images of "frying pan" become in sequence. Moreover, no image of a pan is to be contained. It is difficult for the user to determine whether the two images for "broil by frying pan" indicate the single procedure or the broiling procedures are successive by twice, and it is unclear from the four images that the procedure of utilizing a pan is contained. Hence, such selection of the procedure images 5, 5, . . . is not appropriate.

Note that when the associated images with the recipe is less than four images, all the images may be selected.

Moreover, when the cooking procedure includes less than four procedures, the specified cookware may be selected in sequence. In the case of, for example, the cooking procedure that ends by the procedure "boil by pan" after the procedure "broil by frying pan", the two images of a frying pan may be successive, and then the two images of a pan may be successively selected.

Needless to say, regarding the recipe that ends by the two procedure, the single image selected in accordance with each procedure, and a total of two images may be selected as the procedure images 5 and 5. In this case, since the number of the procedures becomes the number of images, the user who views the procedure images 5 and 5 can grasp the outline of the work details in the procedure, and can grasp the number of procedures.

Figure 6:
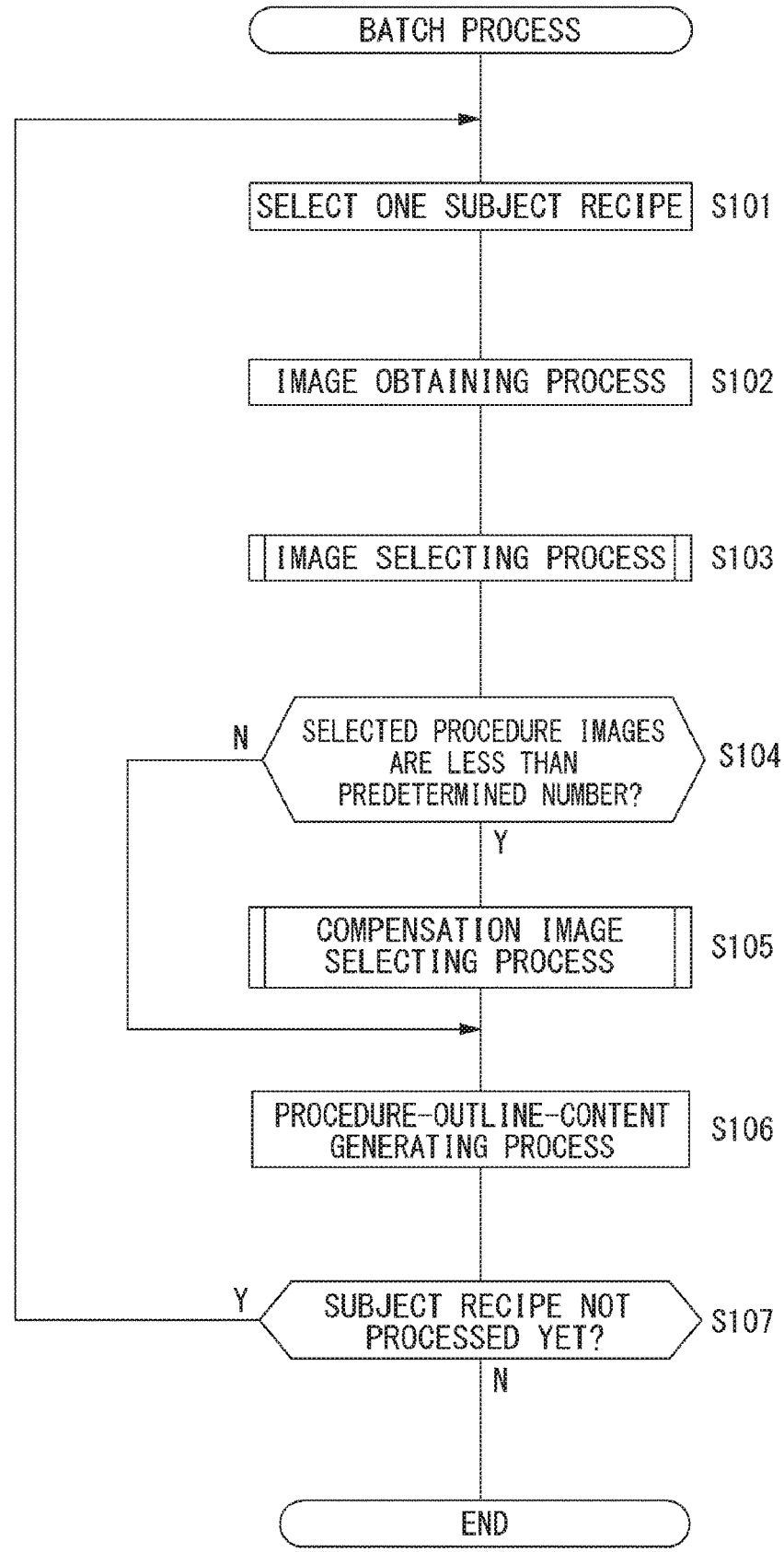
FIG. 6 is a flowchart illustrating a batch process.

Returning to the description on FIG. 6.

The recipe managing server 1 which has selected the procedure images 5, 5, . . . from the images associated with the recipe determines, in subsequent step S104, whether or not the selected procedure images 5, 5, . . . are less than the predetermined number of the images.

When the procedure images 5, 5, . . . are equal to or greater than the predetermined number of the images (i.e., the predetermined number of the images is attainable), the recipe managing server 1 progresses the process to a procedure-outline-content generating process in step S106.

In contrast, when the procedure images 5, 5, . . . are less than the predetermined number of the images, the recipe managing server 1 progresses the process to step S106 after executing a compensation image selecting process in step S105.

The compensation image selecting process in the step S105 is a process of additionally selecting the procedure image 5 so as to attain the predetermined number of the images.

More specifically, this will be described with reference to FIG. 8.

In the compensation image selecting process, first, the recipe managing server 1 executes, in step S301, a process of specifying the procedure that does not have the procedure image 5. For example, among the respective procedures contained in the recipe, the procedure that has the corresponding procedure image 5 not selected is specified. Because it is not always true that the user who attempts to post the recipe attaches images to all procedures, there may be a case where there is a procedure that does not have the procedure image 5. In addition, the same is true of a case in which there is no appropriate image to be selected as the procedure image 5.

Note that the procedure specified in this step (i.e., the procedure that has the corresponding procedure image 5 not selected) will be referred to as the "procedure without image".

Subsequently, the recipe managing server 1 obtains, in step S302, text information corresponding to the procedure without image. The posted recipe includes one or a plurality of procedures, and each procedure is formed by text information for describing the work details (e.g., a sentence like "cut XX in a length of 3 cm") and image data (e.g., an image indicating to cut a vegetable with a kitchen knife). In the step S302, the text information on the procedure without image is obtained from the posted recipe information.

Next, the recipe managing server 1 executes, in step S303, a process of analyzing the obtained text information. In the analyzing process, for example, a keyword indicating a cookware to be used or a cooking scheme is extracted from the text information. More specifically, example keywords are "cut", "boil", "pan", and "frying pan". These keywords may be stored in, for example, a DB that is managed by the recipe managing server 1. In this case, the process in the step S303 extracts the keyword from text information by determining whether or not the keyword stored in the DB is contained in the text information.

Subsequently, the recipe managing server 1 executes, in step S304, a process of selecting a general-purpose image in accordance with the text information for describing the work details of the procedure without image. In this process, the general-purpose image based on the above-described analysis result is selected. For example, regarding the procedure without image from which the keyword "cut" is extracted, the general-purpose image indicating the way of cutting a vegetable by a kitchen knife, etc., is selected. Similarly, regarding the procedure without image from which the keyword "frying pan" is extracted, the image that indicates or (images) a frying pan is selected. The selected image in this process becomes the procedure image 5.

Note that the general-purpose image is an image prepared by the recipe managing server 1 in advance, and is stored in the DB managed by the recipe managing server 1. Moreover, the general-purpose image is an illustration image or a picture image corresponding to various kinds of cooking schemes and cookware. Note that some of the picture images posted by the user may be managed by the recipe managing server 1 as the general-purpose images. Moreover, in order to distinguish from the procedure image 5 (picture image) selected from the images extracted from the recipe posted by the user, the general-purpose image may be the illustration image only.

Returning to the description on FIG. 6 again.

When the recipe managing server 1 executes each of the above-described processes, at a time point at which a process in step S106 starts, the predetermined number of the procedure images 5, 5, . . . in accordance with the subject recipe have been selected. Example procedure images 5 are the image associated with the recipe posted by the user and the general-purpose image in accordance with the procedure without image.

The process in the step S106 is to generate the procedure outline content 4 as illustrated in FIG. 4 from the predetermined number of the procedure images 5, 5, . . . . The procedure images 5, 5, . . . are arranged in the progress sequence of a work as described above.

The recipe managing server 1 that has generated the procedure outline content 4 corresponding to the single subject recipe determines, in step S107, whether or not there is the subject recipe not processed yet.

When there is the subject recipe not processed yet, the recipe managing server 1 executes, in the step S101, the process of selecting the one subject recipe again.

In contrast, when there is no subject recipe not processed yet, the recipe managing server 1 ends the sequential processes illustrated in FIG. 6.

By executing the batch process in FIG. 6, the procedure outline content 4 is generated for each subject recipe.

Note that an example case has been described above in which the predetermined number of the procedure images 5, 5, . . . , are selected, but depending on the recipe, it is unnecessary to select the predetermined number of the procedure images 5, 5, . . . .

When, for example, the cooking procedure of the recipe is a few (e.g., cooking can be finished by two procedures), the number of selected procedure images 5, 5, . . . may be less than the predetermined number of the images.

5-2. Second Example of Image Selecting Process

A second example of the image selecting process will be described with reference to FIG. 9.

The recipe managing server 1 executes, in step S401, a process of specifying the foodstuff shown in the image. Regarding this process, for example, the foodstuffs can be extracted by conventional technologies like pattern matching that specifies a face of a person from a picture.

After the foodstuff in each image is specified, the recipe managing server 1 selects, in step S402, the image that shows a primary foodstuff.

The primary foodstuff will be described now.

The primary foodstuff is a foodstuff that can be determined as being important and essential for the recipe. When, for example, a recipe title is "pork XX saute", the primary foodstuff for this recipe is "pork". Moreover, the primary foodstuff is also specifiable from the utilized amount of the foodstuff. When the utilized foodstuff and the amount thereof in the recipe are "pork: 200 g, and potato: 50 g, and the like", "pork" that has the largest utilized amount among the foodstuffs is determined as the primary foodstuff.

As described above, the primary foodstuff is estimated from the recipe title and the utilized amount, etc. Moreover, the primary foodstuff may be determined from the appearance frequency in the text information associated with the recipe.

Accordingly, the image of cooking pork that is the primary foodstuff is likely to be selected as the procedure image 5 rather than the image showing, for example, the way of cooking mashed potato that is a garnish.

Note that when the number of images associated with the recipe is less than four, all the images may be selected.

Needless to say, in the case of the recipe that has four procedures, the number of procedures of cooking a garnish is one and the number of procedures with respect to the primary foodstuff is three, the single image that shows the procedure of cooking the garnish may be selected as the procedure image 5. When, however, the number of procedures of cooking the garnish is one, and the number of procedures with respect to the primary foodstuff is four, it is desirable to select the four procedure images 5, 5, . . . in accordance with the four procedures for the primary foodstuff.

Note that when the number of images that show the primary foodstuff is large, a selection may be made through a method to be described in an example of the other image selecting processes.

5-3. Third Example of Image Selecting Process

Figure 10:
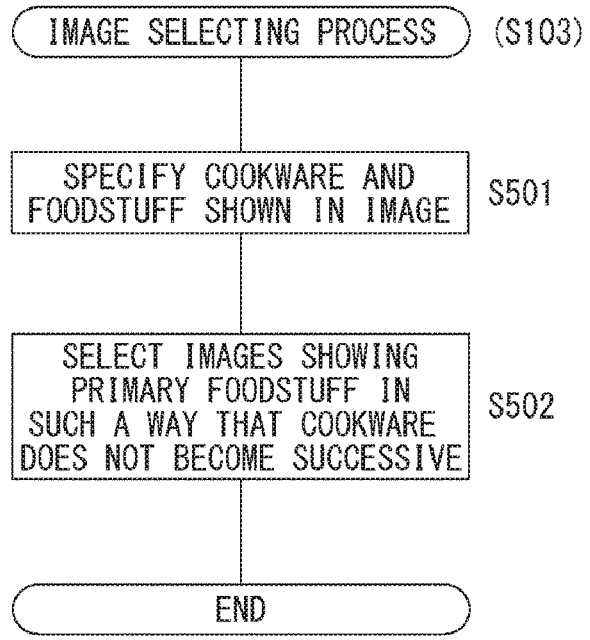
FIG. 10 is a flowchart illustrating a third example of the image selecting process.

A third example of the image selecting process will be described with reference to FIG. 10.

According to the third example of the image selecting process, first, the recipe managing server 1 executes, in step S501, a process of specifying the cookware and the foodstuff shown in the image.

Subsequently, the recipe managing server 1 selects, in step S502, the procedure images 5, 5, . . . in such a way that the specified cookware does not become successive when the images are arranged in accordance with the cooking procedure among the images that show the primary foodstuff.

That is, by eliminating the image relating to the procedure of cooking a garnish, etc., and by selecting the images in such a way that the cookware does not become successive, the flow of the procedure for the primary foodstuff becomes easy to understand.

5-4. Fourth Example of Image Selecting Process

Figure 11:
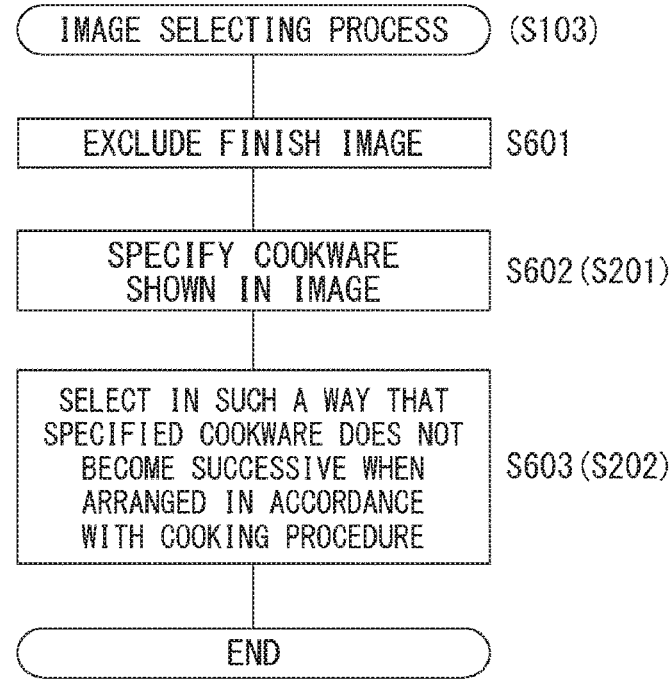
FIG. 11 is a flowchart illustrating a fourth example of the image selecting process.

A fourth example of the image selecting process will be described with reference to FIG. 11.

The image selecting process is executed with the image associated with the subject recipe being obtained. According to the fourth example of the image selecting process, a process of excluding a part of the obtained images is executed.

More specifically, the recipe managing server 1 executes, in step S601, a process of excluding the image estimated as showing the finished state of the cooking.

As illustrated in FIG. 5, the procedure outline content 4 to be generated by the subsequent process is presented in the search result presenting page together with a finish image 12. When the procedure images 5, 5, . . . contained in the procedure outline content 4 contain the equivalent image to the finish image 12 (e.g., the exactly same image and the image picked up at a different angle), two similar images are to be contained in the recipe information 11, and thus the display area of the user terminal 3 cannot be utilized effectively. Hence, the process of excluding the finish image is executed in the step S601.

Subsequently, the recipe managing server 1 executes various processes in the processes subsequent to step S602. FIG. 11 illustrates an example of executing the similar process to the image selecting process described in the above-described batch process. That is, in the step S602, the cookware shown in the image is specified like the step S201, and in step S603, the images are selected in such a way that the cookware does not become successive like the step S202.

Figure 9:
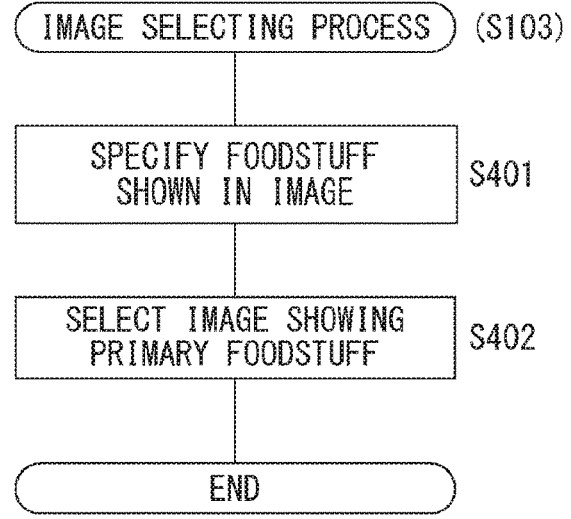
FIG. 9 is a flowchart illustrating a second example of the image selecting process.

Instead of the processes in the steps S602 and S603, the processes in the steps S401 and S402 as illustrated in FIG. 9 may be executed. In other words, after the process of excluding the finish image is executed in the step S601, any one of the image selecting processes as described above (or the image selecting process to be described later) may be executed.

5-5. Fifth Example of Image Selecting Process

Figure 12:
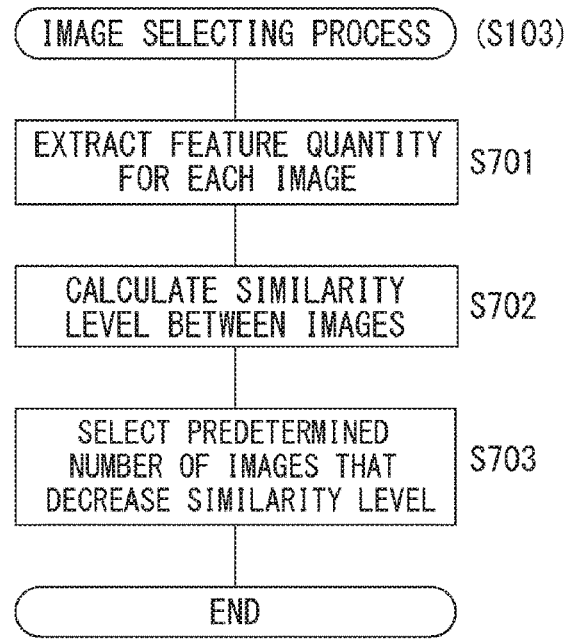
FIG. 12 is a flowchart illustrating a fifth example of the image selecting process.

A fifth example of the image selecting process will be described with reference to FIG. 12.

According to the fifth example of the image selecting process, the image is selected based on a feature quantity extracted for each obtained image.

First, the recipe managing server 1 executes, in step S701, a process of extracting the feature quantity for each obtained image.

Several schemes are considerable regarding the feature quantity of an image. For example, the feature quantity can be calculated based on a number of pixels for a common color, a number of pixels for a common brightness, and a structure, etc. Needless to say, the present disclosure is not limited to such examples, and the feature quantity of an image can be extracted by all conventionally known technologies.

Subsequently, the recipe managing server 1 calculates, in step S702, a similarity level between the images. The similarity level is calculated based on the feature quantity for each image.

Next, the recipe managing server 1 selects, in step S703, the predetermined number of the procedure images 5, 5, . . . in such a way that the similarity level between the images decreases.

For example, after the first procedure image 5 is selected, the second procedure image 5 that has a low similarity level to the foregoing image is selected. Subsequently, the third procedure image that has a low similarity level to the first and second procedure images 5 and 5 is selected. The predetermined number of the procedure images 5, 5, . . . are selected in this way.

5-6. Procedure-Outline-Content Correcting Process

A procedure-outline-content correcting process will be described with reference to FIG. 13.

The procedure-outline-content correcting process is executed when the user who wants to correct the procedure outline content 4 gives an operation.

When, for example, the posting user who views the procedure outline content 4 associated with the posted recipe wants to correct the procedure outline content 4 and operates an operation element on a webpage like a correction button, the process is executed.

Figure 13:
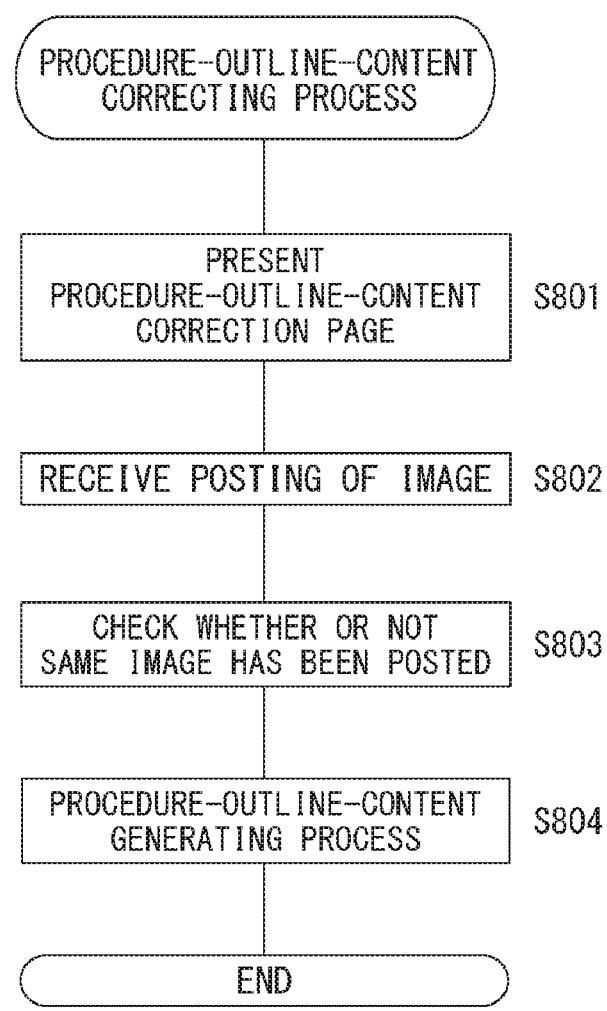
FIG. 13 is a flowchart illustrating a procedure-outline-content correcting process.

The recipe managing server 1 that has received the operation for correction executes the procedure-outline-content correcting process as illustrated in FIG. 13.

First, the recipe managing server 1 executes, in step S801, a process of presenting a procedure-outline-content correction page on the user terminal 3. Accordingly, a webpage as the procedure-outline-content correction page is displayed on the screen, etc., of the user terminal 3.

Subsequently, the recipe managing server 1 receives, in step S802, posting of the image. This process is executed in response to an operation of posting an image that the user wants to put in the procedure outline content 4 as the procedure image 5 on the procedure-outline-content correction page.

Next, the recipe managing server 1 executes, in step S803, a process of checking whether or not the same image as the image newly posted has been already posted.

When the same image has been already posted, the correction of the procedure outline content 4 may be unexecuted in subsequent step S804.

Moreover, an image which is not exactly the same but which is quite similar may be posted in some cases. An example is a case in which the image that is picked up again with the same framing as that of the already-presenting procedure image 5 that is not unsatisfactory for the user is posted. In this case, the procedure image 5 to be replaced and the image newly posted become similar. A determination may be made in step S803 whether or not there is such a similar procedure image 5.

Subsequently, the recipe managing server 1 executes, in step S804, the procedure-outline-content generating process. This Process may be similar to the process in the step S106 of the above-described batch process. That is, this is a process of generating the procedure outline content 4 from the newly posted procedure image 5, and the already-selected procedure images 5, 5, . . . . Moreover, when the determination is made in the immediate step S803 that there is the similar procedure image 5, a process of simply replacing the similar procedure image 5 with the newly posted image may be executed. By checking in the immediate step S803, whether or not there is the similar procedure image 5, the process details of the procedure-outline-content generating process in the step S804 can be simplified.

Note that the user may be allowed to specify the procedure image 5 to be replaced. In this case, also, the process details of the procedure-outline-content generating processing in the step S106 can be simplified.

Moreover, instead of the replacement of the procedure image 5, an addition thereof may be enabled. For example, the procedure-outline-content correction page may be formed so as to allow the user to select the replacement of the procedure image or the addition thereof, and when the addition of the procedure image 5 is selected, the one procedure image 5 may be added in the step S804 to generate the new procedure outline content 4.

Furthermore, when a setting is made such that the procedure outline content 4 is not to be generated unless the predetermined number of the procedure images 5, 5, . . . have been attained, an addition (compensation) of the procedure image 5 so as to enable the generation of the procedure outline content 4 may be permitted.

6. Modified Example

Modified examples of the respective processes as described above will be described below.

6-1. First Modified Example

According to a first modified example, all the procedure images 5, 5, . . . are selected from the general-purpose images without adopting the image posted by the user.

An example will be described with reference to FIG. 6.

The recipe managing server 1 executes the compensation image selecting process in the step S105 without executing the steps S102, S103, and S104 after the one subject recipe is selected in the step S101. In other words, the compensation image selecting process is executed without selecting the procedure images 5, 5, . . . from the images associated with the recipe posted by the user.

Figure 8:
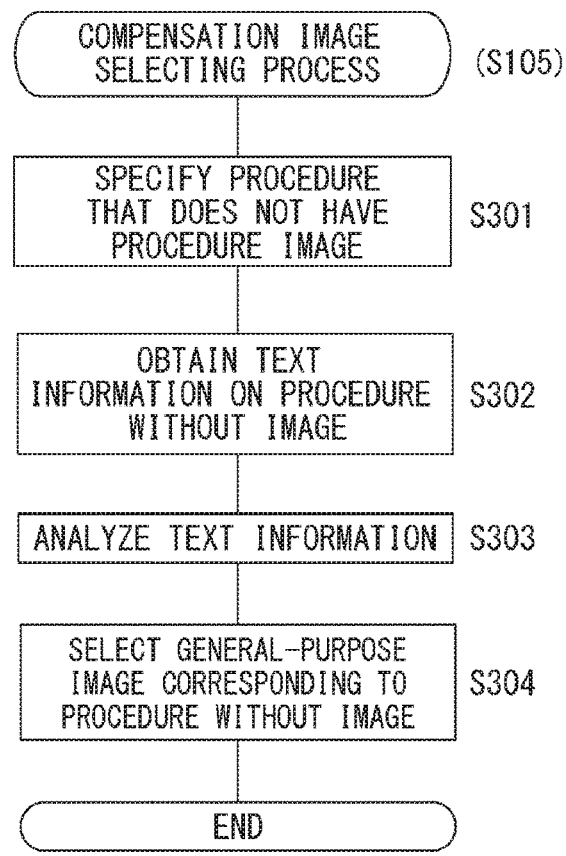
FIG. 8 is a flowchart illustrating a compensation image selecting process.

In the compensation image selecting process, the recipe managing server 1 obtains the text information for each procedure by executing the step S302 but without executing the process in the step S301 as illustrated in FIG. 8. Next, the recipe managing server 1 analyzes, in the step S303, text information, and executes, in the step S304, a process of selecting the general-purpose images for the respective processes as the procedure images 5, 5, . . . .

Hence, a picture image that is individually picked up by the user and an illustration image individually drawn by the user are eliminated, and the procedure images 5, 5, . . . are selected uniformly.

Hence, it is easy for the user who views the procedure outline content 4 in the search result presenting page to grasp what cooking procedure is contained in the recipe. In particular, a difficulty in understanding of the procedures of the recipe due to an unusual framing, a devisal in image pickup and the like of the posted image picked up by the user can be eliminated.

6-2. Second Modified Example

The above-description has been given of an example case in which the procedure image 5 is selected from the still images posted by the user and the general-purpose images prepared in advance. In this paragraph, an example case will be described in which, when the user posts a motion image for a cooking with the recipe, the procedure image 5 is selected from the motion image.

The motion image successively shows still images so as to express a motion. Hence, the motion image can be considered as a set of still images. That is, each process of selecting the procedure images 5, 5, . . . from a motion image is achievable by the process of selecting the procedure image 5 from the still images like the above-described respective examples.

Several examples are considerable regarding which still image is to be selected as the procedure image 5. For example, an image that has a large change from the image immediately before is selected as the procedure image 5. This causes an image at a moment of, for example, changing to a still image of broiling YZ from a still image of cutting XX to be selected as the procedure image 5. That is, the image that shows different cookware and foodstuff is selected as the procedure image 5.

Moreover, the procedure images 5, 5, . . . may be selected with the replay time length of a motion image being taken into consideration. More specifically, when, for example, the four procedure images 5, 5, . . . are selected from a motion image that has a replay time length of 20 minutes, the still images at time points at which 2 minutes and 30 seconds, 7 minutes and 30 seconds, 12 minutes and 30 seconds, and 17 minutes and 30 seconds have elapsed from the replay start (i.e., a constant time interval) are selected as the procedure images 5, 5, . . . . Note that as described above, when the exclusion of a finish image is taken into consideration, a circumstance is taken into consideration in which the part of the motion image near the end is a motion image of a finished cooking. Hence, still images at time points at which 2 minutes, 6 minutes, 10 minutes, and 14 minutes have elapsed from the replay start (when the replay time length of the motion image is 20 minutes) are selected as the procedure images 5, 5, . . . .

6-3. Third Modified Example

The above-description has been given of an example case in which the predetermined number is a fixed number regardless of the recipe. However, the predetermined number of the images that is the number of the procedure image 5 contained in the procedure outline content 4 may be set as the number of the cookware to be utilized, and all the cookware utilized in the recipe may be shown in any of the procedure images 5, 5, . . . contained in the procedure outline content 4. In this case, the predetermined number of the images differ for each recipe. This causes the information on all the cookware utilized in the recipe to be presented in a search result presenting page as the procedure images 5, 5, . . . in the procedure outline content 4. Accordingly, a discontinuance in the halfway of cooking due to absence of the cookware to be utilized can be further prevented.

Moreover, the procedure images 5, 5, . . . may be selected from the images that show primal cookware. For example, cookware, such as a chopstick and a measuring spoon, which are not essential to carry on a cooking may be considered as non-primal cookware.

More specifically, when the cookware that are utilized with a recipe A are a "pan", a "frying pan", a "cooking chopstick", a "measuring cup", and a "kitchen knife", the "pan" and the "frying pan" may be considered as the primal cookware. Moreover, the cookware, such as the "cooking chopstick" and the "measuring cup", not essential to carry on a cooking, and the cookware like the "kitchen knife" that has an excessively high possession rate are not considered as the primal cookware. The information on the primal cookware may be managed by any of the DBs managed by the recipe managing server 1. Hence, the procedure images 5, 5, . . . contained in the procedure outline content 4 of this recipe contain at least the image that shows the "pan" and the image that shows the "frying pan".

Note that the predetermined number of the procedure images 5, 5, . . . may be changed in accordance with the number of procedures. For example, regarding the recipe that has five procedures, the five procedure images 5, 5, . . . are selected. Moreover, regarding the recipe that has seven procedures, the seven procedure images 5, 5, . . . are selected. However, in view of the display area of the monitor, etc., of the user terminal 3, it is desirable to set an upper limit value (e.g., eight images) in such a way that too many procedure images 5, 5, . . . are not displayed.

7. Summary

The recipe managing server 1 according to each of the above-described examples includes the image selecting unit 1c that selects, among the images contained in the posted recipe, a predetermined number of the images which are equal to or greater than two as the procedure images 5, 5, . . . based on a difference in the images, the content generating unit 1d that generates the procedure outline content 4 using the predetermined number of the procedure images 5, 5, . . . and the presentation control unit 1e that presents a search result containing the procedure outline content 4.

When the recipe is presented, there is a user who cannot call up, in such a user's mind, an image of how to cook (the cooking procedure). It is difficult for such a user to determine whether or not the user can cook even if the user views the presented recipe.

Accordingly, first, the procedure outline content 4 that contains the procedure images 5 is displayed as a part of the search result.

Selection of the procedure image 5 from the images contained in the posted recipe suppresses a generation of the procedure outline content 4 that does not match the intent of the user who posted the recipe.

Moreover, for example, the plurality of images that has different cookware to be utilized is selected as the procedure images 5 based on the difference in the images and is presented as the procedure outline content 4 to the user. This facilitates the user to grasp through what procedures the cooking advances. Accordingly, a search result that is highly convenient to the user can be presented.

Furthermore, a discontinuance after the cooking starts due to the absence of the necessary cookware can be suppressed. Accordingly, an occurrence of an additional burden for the user for searching the recipe again and that of a search process load for the information processing device (the recipe managing server 1 and the user terminal 3) can be suppressed.

In addition, since the procedure outline content 4 is automatically generated, a burden for a user who posts a recipe is not caused regarding the generation and presentation of the procedure outline content 4. That is, since the user who posts the recipe does not feel that the generation of the procedure outline content 4 is cumbersome when posting the recipe, a reduction in number of the posted recipe because of such a reason does not occur.

Moreover, as described in the batch process (in particular, FIG. 7), the image selecting unit 1*c* selects the procedure image 5 based on the cookware shown in the image.

When the user does not own the cookware to be utilized with the recipe, it may be difficult to utilize the recipe (i.e., to cook). Accordingly, at least some of the cookware to be utilized with the recipe are selected as the procedure images 5.

Accordingly, the procedure outline content 4 that facilitates the user to grasp the cookware to be utilized with the recipe can be generated. Hence, a search result that is significant information to determine whether or not to utilize the recipe can be presented to the user. This prevents the user from mistakenly starting a cooking based on the recipe that is not utilizable for the user.

Furthermore, as described in the fourth example of the image selecting process, the image selecting unit 1*c* selects the procedure image 5 so as to exclude a finished cooking image.

Regarding a search result of a recipe, a finish image is often presented together with the title of cooking and the ingredient, etc. According to the structure of the present disclosure, the predetermined number of the images other than a finished cooking image are selected and are presented to the user as the procedure outline content 4.

Hence, a finished cooking image presented separately from the procedure outline content 4 is not redundant with a part of the images in the procedure outline content 4. This enables a presentation of a further large quantity of information to the user in the same presentation area.

Moreover, a larger quantity of information can be transmitted at the same traffic quantity than transmission of the same and duplicated information, effectively utilizing a communication band.

Furthermore, as described in the batch process (in particular, FIG. 8), the image selecting unit 1*c* selects a part of the predetermined number of the procedure images 5, 5, . . . from the general-purpose images prepared in addition to the images contained in the posted recipe.

When, for example, even if the number of contained images in the recipe posted by the user is less than the predetermined number, the procedure outline content 4 compensated by the general-purpose image is generated and presented to the user.

Hence, it is unnecessary to execute a process of, for example, not permitting recipe posting because the predetermined number of the images are not contained when the recipe is to be posted. That is, it is possible to avoid an increase in burden for the user who posts the recipe so as to create the recipe that contains the predetermined number of the images, and a reduction in number of the posted recipes.

Moreover, because the procedure outline content 4 that contains the images which are less than the predetermined number is not generated, the procedure outline content 4 that has insufficient information is prevented from being provided to the user.

Next, as described in the batch process (in particular, FIG. 8), the image selecting unit 1*c* selects the general-purpose image based on the text analysis for the posted recipe.

For example, the images corresponding to respective cooking schemes, such as "boil" and "broil", are prepared as the general-purpose images, and the optimized image is selected and presented based on the analysis result for the text information for describing the cooking procedure contained in the recipe.

That is, the suitable procedure outline content 4 in accordance with the procedure of the recipe can be created. Moreover, the possibility such that the image in accordance with the intent of the user who posts the recipe (the posting user) is selected is enhanced even if such an image is the general-purpose image.

In addition, as described in the procedure-outline-content correcting process (FIG. 13), the content generating unit 1*d* receives a replacement operation or an addition operation of the procedure image 5, and generates the procedure outline content 4.

When, for example, the number of the procedure images 5 is less than the predetermined number and thus the procedure outline content 4 cannot be generated, addition of the procedure image 5 enables the generation of the procedure outline content 4.

This achieves an enhancement of a search result to be presented to the user.

Moreover, when the procedure outline content 4 does not match the intent of the user who posts the recipe or when inappropriate, the new procedure outline content 4 is generated by replacing the procedure image 5.

This enables a generation of the procedure outline content 4 that matches the intent of the user who posts the recipe.

Note that as an example search result to be presented to the user, an example case has been described in which the recipe extracted based on the search query specified by the user is presented in the search result presenting page, but other examples are applicable.

When, for example, a recommended recipe is presented to the user in the top page of the recipe website, such a recommended recipe is a recipe which has been searched and extracted based on, for example, unique information to the user, and seasonal information. That is to say, the presentation of the recommended recipe is also the presentation of the search result.

Moreover, an example case in which a group of recipes is presented in accordance with a theme will now be described. More specifically, a group of recipes in accordance with a theme like "large collection of autumn taste sensations" may be presented to the user.

The group of recipes in this case is a set of recipes searched and extracted using a keyword determined based on the theme (e.g., a word like a foodstuff frequently eaten in autumn and a word like autumn itself). Accordingly, a presentation of the group of recipes in accordance with the theme can be achieved by the similar process to the process of presenting the search result.

8. Program and Storage Medium

While the recipe managing server 1 according to the embodiment of the information processing device of the present disclosure has been described above, the program according to the embodiment is a program that causes the information processing device (a CPU, and the like) to execute each process in the recipe managing server 1.

The program according to the embodiment causes the information processing device to execute an image selecting function of selecting, among the images contained in the posted recipe, a predetermined number of the images which are equal to or greater than two as the procedure images based on a difference in the images among the images contained in the posted recipe.

The program causes the information processing device to execute a content generating function of generating the procedure outline content using the predetermined number of the procedure images.

And the program causes the information processing device to execute a presentation control function of presenting a search result containing the procedure outline content.

That is, this program is a program that causes the recipe managing server 1 to execute the respective processes as illustrated in FIGS. 6 to 13.

Such a program can achieve the information processing device as the above-described recipe managing server 1.

Such a program can be recorded in advance in an HDD that is a storage medium built in a device like a computer apparatus, a ROM of a microcomputer that includes a CPU, and the like. Alternatively, the program may be temporarily or permanently stored (recorded) in a removable storage medium, such as a semiconductor memory, a memory card, an optical disk, a magneto-optical disk, or a magnetic disk. Moreover, such a removable storage medium may be provided as a so-called package software.

Moreover, such a program may be installed in a personal computer, etc., from a removable storage medium, and also may be downloaded via a network, such as a LAN or the Internet, from a download site.

REFERENCE SIGNS LIST

1 Recipe managing server, 1a Recipe managing unit, 1b User managing unit, 1c Image selecting unit, 1d Content generating unit, 1e Presentation control unit, 2 Communication network, 3 User terminal, 4 Procedure outline content, 5 Procedure image, 50 User DB, 51 Recipe DB, 52 Search DB, 53 Webpage DB

The invention claimed is:

1. An information processing device comprising:
   at least one memory configured to store computer program code; and
   at least one processor configured to access said computer program code and operate as instructed by said computer program code, said computer program code including:
      image selecting code configured to cause at least one of said at least one processor to select, as procedure images, two or greater number of images among a plurality of images contained in information on a posted specific recipe, the procedure images concerning a procedure of the specific recipe;
      content generating code configured to cause at least one of said at least one processor to, in response to the specific recipe being newly posted and stored in a recipe database configured to store information of a plurality of recipes, automatically generate procedure outline content using the two or greater number of the procedure images, the procedure outline content concerning the procedure of the specific recipe, and store, in a search database, the procedure outline content as a part of a search result to be presented corresponding to a search query, the search database being configured to store a plurality of recipes as search results in association with respective search keywords;
      search code configured to cause at least one of said at least one processor to periodically execute a search process using a search keyword and store search results, extracted in the search process, in the search database in association with the search keyword; and
      presentation control code configured to cause at least one of said at least one processor to, in response to a search keyword input by a user, extract a recipe corresponding to the input search keyword from the recipe database, obtain a procedure outline content concerning a procedure of the extracted recipe and associated with the input search keyword from the search database, and present the extracted recipe and the obtained procedure outline content as a search result,
   wherein the image selecting code is further configured to cause at least one of said at least one processor to, with respect to each of the plurality of images contained in information on the posted specific recipe:
      extract a feature quantity of each image, the feature quantity based on a number of pixels for a common color and a number of pixels for a common brightness;
      obtain a similarity level between images based on a feature quantity of each image; and
      select the two or greater number of images having a low similarity level with each other among the plurality of images as procedure images.

2. The information processing device according to claim 1, wherein
   the image selecting code is configured to cause at least one of said at least one processor to select a procedure image based on a cookware shown in the procedure image.

3. The information processing device according to claim 1, wherein
   the image selecting code is configured to cause at least one of said at least one processor to select a procedure image so as to exclude a finished cooking image.

4. The information processing device according to claim 1, wherein
   the image selecting code is configured to cause at least one of said at least one processor to select the two or greater number of images as the procedure images from general-purpose images prepared in addition to the images contained in the posted recipe.

5. The information processing device according to claim 4, wherein
   the image selecting code is configured to cause at least one of said at least one processor to select the general-purpose image based on text analysis for the posted recipe.

6. The information processing device according to claim 1, wherein
   the content generating code is configured to cause at least one of said at least one processor to receive a replacement operation or an addition operation of a procedure image, and to generate the procedure outline content.

7. The information processing device according to claim 1, wherein said computer program code further comprises compensation image selecting code configured to cause at least one of said at least one processor to, in response to the selected two or greater number of images being less than a predetermined number, perform:

identifying a procedure in the specific recipe that does not have a corresponding procedure image;

obtaining text information corresponding to the procedure that does not have the corresponding procedure image, and extracting a keyword indicating a cookware or a cooking scheme from the text information; and selecting, from a plurality of general-purpose images stored in a database, a general-purpose image in accordance with the extracted keyword, and adding the selected general-purpose image in the procedure outline content.

8. An information processing method executed by an information processing device, the information processing method comprising:

selecting, as procedure images, two or greater number of images among a plurality of images contained in information on a posted specific recipe, the procedure images concerning a procedure of the specific recipe;

in response to the specific recipe being newly posted and stored in a recipe database configured to store information of a plurality of recipes, automatically generating procedure outline content using the two or greater number of the procedure images, the procedure outline content concerning the procedure of the specific recipe, and storing, in a search database, the procedure outline content as a part of a search result to be presented corresponding to a search query, the search database being configured to store a plurality of recipes as search results in association with respective search keywords;

periodically executing a search process using a search keyword and store search results, extracted in the search process, in the search database in association with the search keyword; and in response to a search keyword input by a user, extracting a recipe corresponding to the input search keyword from the recipe database, obtaining a procedure outline content concerning a procedure of the extracted recipe and associated with the input search keyword from the search database, and presenting the extracted recipe and the obtained procedure outline content as a search result, wherein the selecting the two or greater number of images comprises, with respect to each of the plurality of images contained in information on the posted specific recipe:

extracting a feature quantity of each image, the feature quantity based on a number of pixels for a common color and a number of pixels for a common brightness;

obtaining a similarity level between images based on a feature quantity of each image; and selecting the two or greater number of images having a low similarity level with each other among the plurality of images as procedure images.

9. A non-transitory computer readable storage medium having stored thereon a computer program configured to cause at least one processor to:

select, as procedure images, two or greater number of images among a plurality of images contained in information on a posted specific recipe, the procedure images concerning a procedure of the specific recipe;

in response to the specific recipe being newly posted and stored in a recipe database configured to store information of a plurality of recipes, automatically generate procedure outline content using the two or greater number of the procedure images, the procedure outline content concerning the procedure of the specific recipe, and store, in a search database, the procedure outline content as a part of a search result to be presented corresponding to a search query, the search database being configured to store a plurality of recipes as search results in association with respective search keywords;

periodically execute a search process using a search keyword and store search results, extracted in the search process, in the search database in association with the search keyword; and response to a search keyword input by a user, extract a recipe corresponding to the input search keyword from the recipe database, obtain a procedure outline content concerning a procedure of the extracted recipe and associated with the input search keyword from the search database, and present the extracted recipe and the obtained procedure outline content as a search result, wherein selecting the two or greater number of images comprises, with respect to each of the plurality of images contained in information on the posted specific recipe:

extracting a feature quantity of each image, the feature quantity based on a number of pixels for a common color and a number of pixels for a common brightness;

obtaining a similarity level between images based on a feature quantity of each image; and selecting the two or greater number of images having a low similarity level with each other among the plurality of images as procedure images.

\* \* \* \* \*